United States Patent
Robertson et al.

(10) Patent No.: US 11,055,672 B2
(45) Date of Patent: Jul. 6, 2021

(54) DISPOSABLE PRODUCT QUANTIFICATION AND MANAGEMENT

(71) Applicant: Kimberly-Clark Worldwide, Inc., Neenah, WI (US)

(72) Inventors: John C. Robertson, Sherwood, WI (US); Andrew Mark Long, Appleton, WI (US); Shawn Jeffrey Sullivan, Neenah, WI (US); Jonathan D. Boulos, Appleton, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 55 days.

(21) Appl. No.: 15/509,035

(22) PCT Filed: Oct. 31, 2014

(86) PCT No.: PCT/US2014/063306
§ 371 (c)(1),
(2) Date: Mar. 6, 2017

(87) PCT Pub. No.: WO2016/068970
PCT Pub. Date: May 6, 2016

(65) Prior Publication Data
US 2017/0249602 A1     Aug. 31, 2017

(51) Int. Cl.
*G06Q 10/00* (2012.01)
*G06Q 10/06* (2012.01)
*G06Q 10/08* (2012.01)

(52) U.S. Cl.
CPC ....... *G06Q 10/30* (2013.01); *G06Q 10/06312* (2013.01); *G06Q 10/06314* (2013.01); *G06Q 10/087* (2013.01); *Y02W 90/00* (2015.05)

(58) Field of Classification Search
CPC . Y02W 90/20; G06Q 10/30; G06Q 10/06312; G06Q 10/06314; G06Q 10/087
See application file for complete search history.

(56) References Cited

U.S. PATENT DOCUMENTS 5,904,671 A * 5/1999 Navot .............. A61F 13/20
340/573.5
6,678,685 B2 * 1/2004 McGill .............. G06Q 30/02
705/14.14

(Continued)

FOREIGN PATENT DOCUMENTS

JP     2002/007573 A     1/2002
JP     2004/139545        5/2004

(Continued)

OTHER PUBLICATIONS

PCT International Search Report for corresponding PCT Application No. PCT/US2014/063306, dated Jul. 15, 2015—3 pages.

(Continued)

*Primary Examiner* — Peter Ludwig
*Assistant Examiner* — Michael Jared Walker
(74) *Attorney, Agent, or Firm* — Dority & Manning, P.A.

(57) ABSTRACT

Systems and methods for processing signals from sensors associated with disposable products are provided. Signals indicative of disposable product consumption and an available quantity of disposable products can be processed. Data associated with the signals can be communicated to an assessment module. The data can include location information associated with the disposable product consumption and available quantity of disposable products. The assessment module can estimate disposable product usage for different locations based on the data. The assessment module can provide notifications of inventory status for the different locations based on the estimated disposable product usage.

14 Claims, 7 Drawing Sheets

(56) References Cited

U.S. PATENT DOCUMENTS

| | | | | |
|---|---|---|---|---|
| 6,870,479 B2* | 3/2005 | Gabriel | .................. | A61F 13/42 340/604 |
| 7,130,814 B1* | 10/2006 | Szabo | ............... | G06Q 30/0201 705/26.8 |
| 7,249,708 B2* | 7/2007 | McConnell | ........... | G06Q 30/02 235/380 |
| 7,250,547 B1* | 7/2007 | Hofmeister | ............. | A61F 13/42 340/573.5 |
| 7,333,020 B2* | 2/2008 | Cohen | .................. | A61B 5/038 340/573.1 |
| 7,834,234 B2* | 11/2010 | Roe | ........................ | A61F 13/42 604/361 |
| 7,977,529 B2* | 7/2011 | Bergman | ............... | G06Q 50/22 604/361 |
| 8,057,454 B2* | 11/2011 | Long | ....................... | A61F 13/42 604/385.26 |
| 8,126,784 B1* | 2/2012 | Agarwal | .............. | G06Q 10/087 705/28 |
| 8,257,274 B2* | 9/2012 | Medina | .................... | A61B 5/01 600/549 |
| 8,274,393 B2* | 9/2012 | Ales | ........................ | A61F 13/42 340/604 |
| 8,314,284 B1* | 11/2012 | Novello | ................ | A61F 13/505 604/361 |
| 8,359,240 B2* | 1/2013 | Stevens | .............. | G06Q 30/0633 705/26.4 |
| 8,374,925 B2* | 2/2013 | Liamos | .................. | G16H 40/20 705/28 |
| 8,378,167 B2* | 2/2013 | Allen | ...................... | A61F 13/42 604/361 |
| 8,538,824 B1* | 9/2013 | McKay | ............... | G06Q 30/0264 705/26.1 |
| 8,626,562 B2* | 1/2014 | Milman | .............. | G06Q 30/0201 705/7.29 |
| 8,664,467 B2* | 3/2014 | Roe | ........................ | A61F 13/42 604/361 |
| 2002/0049652 A1* | 4/2002 | Moore | ............... | G06Q 10/0875 705/29 |
| 2004/0078219 A1* | 4/2004 | Kaylor | .................. | G06Q 50/22 705/2 |
| 2004/0088224 A1* | 5/2004 | Mukai | ................ | G06Q 10/0637 705/7.36 |
| 2004/0186788 A1* | 9/2004 | Czuchry, Jr. | ........ | G06Q 30/0601 705/26.1 |
| 2004/0220538 A1* | 11/2004 | Panopoulos | ............ | A61F 13/42 604/361 |
| 2005/0038328 A1* | 2/2005 | Stoehrer | ............ | A61B 5/02055 600/301 |
| 2005/0075954 A1* | 4/2005 | Matsumoto | .......... | G06Q 10/087 705/28 |
| 2005/0148978 A1* | 7/2005 | Brumm | ................... | A61F 13/42 604/385.01 |
| 2006/0287927 A1* | 12/2006 | True | ..................... | G06Q 10/087 705/26.1 |
| 2007/0252714 A1* | 11/2007 | Rondoni | .............. | A61B 5/0002 340/573.5 |
| 2008/0058680 A1* | 3/2008 | Lee | .......................... | A61B 8/56 600/587 |
| 2008/0058740 A1* | 3/2008 | Sullivan | .................. | A61F 13/42 604/361 |
| 2008/0074274 A1* | 3/2008 | Hu | .......................... | A61F 13/42 340/573.5 |
| 2008/0110984 A1* | 5/2008 | Uchitani | ............... | A61F 15/001 235/385 |
| 2008/0210702 A1* | 9/2008 | Lochinger | ............ | A47K 5/1217 221/7 |
| 2009/0119142 A1* | 5/2009 | Yenni | ...................... | H04L 67/12 705/7.15 |
| 2009/0248545 A1* | 10/2009 | Robinson | ............... | G06Q 10/06 705/26.1 |
| 2010/0106626 A1 | 4/2010 | Ashrafzadeh et al. | | |
| 2010/0168702 A1* | 7/2010 | Ales, III | ................ | A61B 5/202 604/361 |
| 2012/0040655 A1* | 2/2012 | Larkin | ................. | A61B 5/0002 455/418 |
| 2012/0154169 A1* | 6/2012 | Hoekstra | ................ | G06Q 10/10 340/870.01 |
| 2012/0206265 A1* | 8/2012 | Solazzo | ................. | G08B 25/10 340/573.5 |
| 2012/0312875 A1* | 12/2012 | Von Beichmann | .. | G06Q 10/087 235/385 |
| 2013/0060577 A1* | 3/2013 | DeBusk | ................ | G06Q 50/28 705/3 |
| 2013/0110064 A1* | 5/2013 | Richardson | ............. | A61F 13/42 604/361 |
| 2013/0303867 A1* | 11/2013 | Elfstrom | ................. | A61F 13/42 600/345 |
| 2013/0310967 A1 | 11/2013 | Olson et al. | | |
| 2014/0006117 A1* | 1/2014 | Kritt | ................... | G06Q 30/0241 705/14.4 |
| 2014/0006131 A1* | 1/2014 | Causey | ............... | G06Q 10/0875 705/14.24 |
| 2014/0200538 A1* | 7/2014 | Euliano | ................ | G01N 27/121 604/361 |
| 2015/0077261 A1* | 3/2015 | Lineberry | ................ | A61F 13/42 340/604 |
| 2015/0154169 A1* | 6/2015 | Theobald | ............... | G06F 40/169 715/230 |
| 2018/0036180 A1* | 2/2018 | Long | .................. | G06K 9/00771 |

FOREIGN PATENT DOCUMENTS

| | | |
|---|---|---|
| JP | 2010/194277 | 9/2010 |
| KR | 20100049044 A | 5/2010 |
| KR | 101271547 | 6/2013 |

OTHER PUBLICATIONS

Korean Office Action Corresponding to Application No. 1020177011857 dated Dec. 29, 2020.

* cited by examiner

DISPOSABLE PRODUCT QUANTIFICATION AND MANAGEMENT

FIELD

The present disclosure relates generally to sensors associated with disposable products, and more particularly, to processing signals from sensors associated with disposable products for disposable product quantification and management.

BACKGROUND

Disposable products find widespread use as personal care products. For instance, disposable absorbent articles used by consumers can include diapers, children's toilet training pants and other infant and child care products, adult incontinence products and other adult care products, sanitary napkins, feminine care products, surgical bandages, sponges, medical garments and other disposable products. These disposable products can absorb and contain body waste and can be discarded after a limited period of use. Disposable products are typically not intended to be laundered or otherwise restored for reuse.

Caregivers monitoring the hygienic needs of care recipients often do not track their inventory of disposable products effectively. This is particularly true for product use away from the home. For instance, a grandparent may use more diapers for changing an infant when the infant is located at the grandparent's home relative to use of diapers for changing the infant at home. Failure to accurately track inventory of disposable products at one or more particular locations can result in running out of the disposable product at different locations at inopportune times, leading to increased stress and disruption to the routine of the caregiver and care recipient.

Various systems are available to assist with monitoring consumption of disposable products. For instance, wetness sensing systems can include sensors that are disposed on an absorbent article that provide signals to alert a caregiver as to when the absorbent article is wet or has become soiled. Dispensers for disposable products can also include various sensors to monitor an available quantity of disposable products in the dispenser.

SUMMARY

Aspects and advantages of embodiments of the present disclosure will be set forth in part in the following description, or may be learned from the description, or may be learned through practice of the embodiments.

One example aspect of the present disclosure is directed to a method for processing signals from one or more sensors associated with disposable products. The method can include receiving, by one or more computing devices, a first signal indicative of consumption of a disposable product from a consumption sensor associated with the disposable product and receiving, by the one or more computing devices, a second signal indicative of an available quantity of the disposable product from a sensor associated with a disposable product dispenser. The method can further includes notifying, by the one or more computing devices, a user of consumption of the disposable product based at least in part on the first signal from the consumption sensor. The method can further include determining, by the one or more computing devices, first data associated with consumption of the disposable product based at least in part on the first signal. The first data can include location information associated with consumption of the disposable product. The method can further include determining, by the one or more computing devices, second data associated with the available quantity of the disposable product based at least in part on the second signal. The second data can include location information associated with the available quantity of the disposable product. The method can further include communicating, by the one or more computing devices, the first data and the second data to an assessment module. The assessment module can be implemented by one or more processors. The assessment module can be configured to estimate disposable product usage for a particular location based at least in part on the first data and the second data. The method can further include receiving, by the one or more computing devices, a notification of an inventory status for the particular location, the inventory status being determined based at least in part on the disposable product usage estimated by the assessment module.

In particular embodiments, the notification of the inventory status can include a notification to replenish disposable product inventory at the particular location. The notification can include a recommended quantity and/or a recommended type of disposable products. The method can further include receiving, by the one or more computing devices, a user input responsive to the notification. The user input can trigger an inventory replenishment action.

In certain example implementations, the method can further include receiving, by the one or more computing devices, data indicative of user information via a user interface provided for display by the one or more computing devices. The user information can include one or more of an identification of a consumer of the disposable product, an identification of a caretaker of a consumer of the disposable product, location information associated with a consumer of the disposable product, preferred disposable product information associated with a consumer of the disposable product, calendar information associated with a consumer of the disposable product, and other information. The method can include communicating, by the one or more computing devices, the user information to the assessment module. The assessment module can be configured to estimate disposable product usage for the particular location based at least in part on the user information and/or based on a comparative database that includes product usage and habits of similar users.

Variations and modifications can be made to these example aspects and other example aspects of the present disclosure. For example, in particular implementations, the consumption sensor can be affixed to the disposable product. The one or more computing devices can include a mobile computing device capable of being carried by a user while in operation. The assessment module can be implemented by a remote computing device, such as a server in communication with the one or more computing devices. The location information can be determined based at least in part on a positioning system implemented by the one or more computing devices.

Another example aspect of the present disclosure is directed to a system for disposable product quantification and management. The system includes a first sensor configured to monitor consumption of a disposable product and a second sensor configured to monitor an available quantity of the disposable product. The second sensor can be associated with a disposable product dispenser. The system can further include a first module implemented by one or more processors on a computing device. The first module can include computer-readable instructions that when executed by the one or more processors cause the one or more processors to perform operations.

The operations can include various aspects of any of the embodiments disclosed herein. For instance, the operations can include receiving a first signal indicative of consumption of a disposable product from the first sensor; receiving a second signal indicative of an available quantity of the disposable product from the second sensor; notifying a user of consumption of the disposable product based at least in part on the first signal; determining first data associated with consumption of the disposable product based at least in part on first signal, the first data comprising location information associated with the consumption of the disposable product; determining second data associated with the available quantity of the disposable product based at least in part on the second signal, the second data comprising location information associated with the available quantity of the disposable product; communicating the first data and the second data to a second module, the second module implemented by one or more processors, the second module configured to estimate disposable product usage for a particular location based at least in part on the first data and the second data; and receiving a notification of an inventory status for the particular location, the inventory status being determined based at least in part on the disposable product usage estimated by the second module.

Yet another example aspect of the present disclosure is directed to one or more tangible, non-transitory computer-readable media storing computer-readable instructions that when executed by one or more processors cause the one or more processors to perform operations. The operations can include various aspects of any of the embodiments disclosed herein. For instance, the operations can include receiving a first signal indicative of consumption of an absorbent article from a consumption sensor associated with the absorbent article; receiving a second signal indicative of an available quantity of absorbent articles from a sensor associated with an absorbent article dispenser; notifying a user of consumption of the absorbent article based at least in part on the first signal from the consumption sensor; determining first data associated with consumption of the absorbent article based at least in part on first signal, the first data comprising location information associated with the consumption of the absorbent article; determining second data associated with the available quantity of absorbent articles based at least in part on the second signal, the second data comprising location information associated with the available quantity of the disposable product; communicating the first data and the second data to an assessment module, the assessment module implemented by one or more processors, the assessment module configured to estimate absorbent article usage for a particular location based at least in part on the first data and the second data; and receiving a notification of an inventory status for the particular location, the inventory status being determined based at least in part on the absorbent article usage estimated by the assessment module.

In a particular implementation of this example aspect, the operations can further include receiving data indicative of user information via a user interface and communicating the data indicative of user information to the assessment module. The assessment module can be configured to estimate the absorbent article usage for the absorbent article based at least in part on the user information. In other example implementations, the operations can further include receiving a user input responsive to the notification of an inventory status. The user input can trigger an inventory replenishment action.

Other aspects of the present disclosure are directed to systems, apparatus, tangible, non-transitory computer-readable media, user interfaces and devices for processing signals from one or more sensors associated with disposable products.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussions of embodiments directed to one of ordinary skill in the art are set forth in the specification, which makes reference to the appended figures, in which.

DETAILED DESCRIPTION

Reference now will be made in detail to embodiments, one or more examples of which are illustrated in the drawings. Each example is provided by way of explanation of the embodiments, not limitation of the invention. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to systems and methods for processing signals received from sensors associated with disposable products, for instance, for disposable product inventory quantification and management. More particularly, signals from sensors associated with disposable product consumption and quantity can be received by a computing device, such as a smartphone, tablet, mobile device or other computing device. The signals can be received, for instance, from a sensor configured to monitor consumption of a disposable product and a sensor associated with a disposable product dispenser configured to monitor a quantity of the disposable product. The signals can be correlated with location information determined by, for instance, a positioning system associated with the user device or other device. The signals can also be correlated with user data input into the computing device via a suitable user interface. The user data can include information optionally provided by a user, such as identification of consumers of the disposable products, characteristics (e.g. age, weight, sex, etc.) of the consumers of the disposable products, identification of caretakers of the consumers of disposable products, preferred disposable product information, time schedules and calendar information associated with consumers of the disposable products, and other information.

The information received at the computing device can be processed and communicated to an assessment module. It will be appreciated that the term "module" refers to computer logic utilized to provide desired functionality. Thus, a module can be implemented in hardware, application specific circuits, firmware and/or software controlling a general purpose processor. In one embodiment, the modules are program code files loaded into memory and executed by a processor or can be provided from computer program products, for example computer executable instructions, that are stored in a tangible non-transitory computer-readable storage medium. When software is used, any suitable programming language or platform can be used to implement the module.

The assessment module can be implemented by the computing device or by a remote computing device, such as a server in communication with the computing device over a network, such as the Internet. The assessment module can store the received information in a consumer information database. The consumer information database can collect information concerning the use of disposable products by the consumer, including user trends, preferences, schedules, etc. The storage of the consumer information can be optional to the user and the user can maintain control over how the consumer information is processed and accessed.

The assessment module can access the consumer information stored in the consumer information database and the information communicated from the computing device and can estimate disposable product usage based on the information. More particularly, according to example aspects of the present disclosure, the assessment module can estimate disposable product usage for a particular location based at least in part on the information communicated from the computing device.

Using the location information correlated with the information by the computing device, the assessment module can predict disposable product usage for different particular locations of the consumer. For instance, the assessment module can predict a first estimated disposable product usage for a first location associated with the consumer and a second estimated disposable product usage for a second location associated with the consumer. In this way, different trends in disposable product usage associated with different locations can be taken into account in inventory management of the disposable products.

An inventory status can be determined by the assessment module based on the estimated product usage. For instance, the assessment module can predict when an inventory of disposable products at a particular location will be depleted based on the estimated disposable product usage associated with the particular location. A notification of the inventory status can be provided to the computing device from the assessment module. The notification can include a recommendation to replenish a recommended quantity of disposable products at a particular location. In addition and/or in the alternative, the notification can include a recommendation as to the type of disposable products to be used at a particular location for a particular consumer. The user can provide a response to the notification that triggers a replenishment action. For instance, the response can be communicated to a remote computing device, which can coordinate the purchase and delivery of the disposable products based on the inventory status.

As an example, a caretaker of an infant can implement an application on the caretaker's smartphone that allows the caretaker to monitor and control inventory of diapers for the infant. The smartphone can receive signals from a disposable product sensor disposed on the diaper that monitors when the diaper has been soiled and needs to be changed. The smartphone can also receive signals indicative of an available quantity of diapers from a dispenser sensor associated with a diaper dispenser.

The signals from the sensors can be processed to generate data associated with consumption of the diapers by the infant at particular locations, such as at the home and at a location remote from the home, such as at a grandparent's home or childcare facility. For instance, location data can be associated with the signals from the sensors. The location data can be determined, for instance, by a positioning system (e.g. a GPS system) associated with the smartphone. The location data can be determined from other sources, such as location signals from the sensors themselves or from network devices used to communicate the signals (e.g. a WiFi hotspot in the user's home).

The information collected by the smartphone can be communicated to an assessment module implemented, for instance, on a remote server via a network. The assessment module can process the information received from the smartphone as well as other data received from the smartphone, such as user data input via a suitable user interface. The user data can include the age of the infant, the size of the infant, preferred products for the infant, the identification of caretakers for the infant, and other information. The assessment module can process the available information to estimate diaper usage for the baby at different locations.

For instance, the assessment module can process information associated with a first location (e.g. the infant's home) to estimate use of the diapers at the first location over a given time period. Similarly, the assessment module can process information associated with the second location (e.g. the grandparent's home) to estimate use of the diapers at the second location over a given time period. The estimated diaper usage at the first location can be different from the estimated diaper usage at the second location.

The estimated usage in conjunction with data associated with the available quantity of diapers at a given location (e.g. determined based on signals received from a dispenser sensor) can be used to determine an inventory status. When the inventory status at a particular location is indicative of a need for replenishment, a notification can be communicated to the caretaker, for instance, via the smartphone. The notification can include a recommended quantity of diapers to be replenished as well as other recommendations, such as types of diapers to purchase, size of diapers, whether to start transitioning to potty training, etc.

The caretaker can respond to the notification to trigger an inventory replenishment action. The inventory replenishment action can coordinate the purchase and delivery of diapers to a particular location. The inventory replenishment action can be triggered based on automated responses or manual responses to the notifications input by the users via a user interface implemented on the smartphone.

In this way, example aspects of the present disclosure can provide a convenient way for users to manage inventory of disposable products at a variety of different locations by processing signals from sensors associated with disposable product consumption. The signals can be correlated with location information to facilitate the management of inventory at different locations. In addition, a database of consumer information, such as disposable product usage trends, user preferences and characteristics, characteristics of the disposable product usage, etc. can be optionally collected at a central location to facilitate and enhance estimates of future disposable product usage by the consumer.

Figure 1:
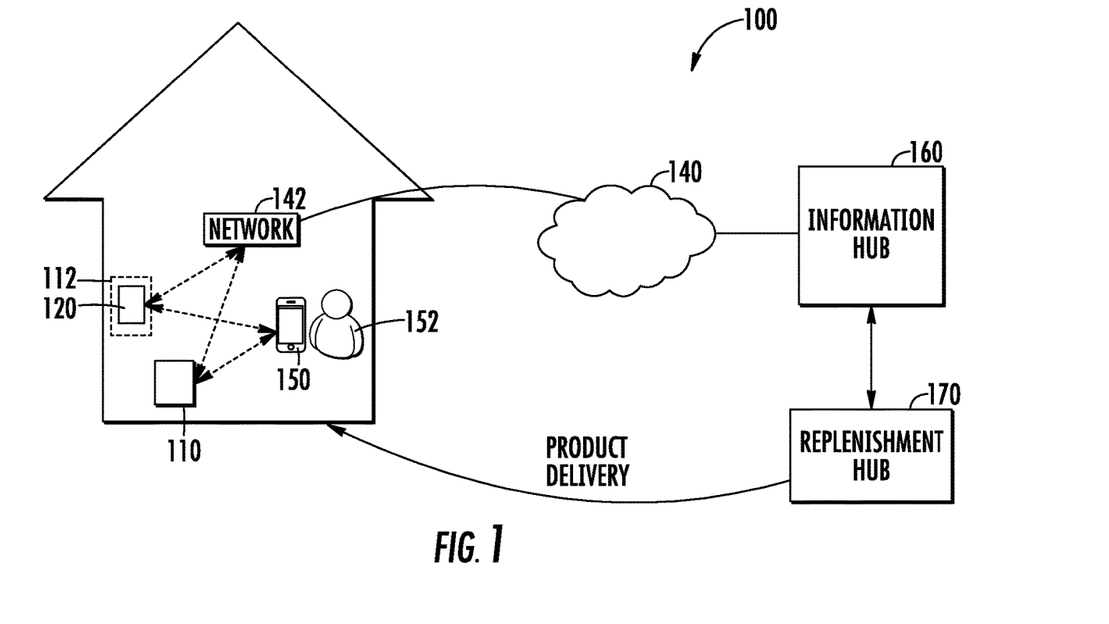
FIG. 1 depicts an overview of an example system according to example embodiments of the present disclosure.

FIG. 1 depicts an overview of an example system 100 according to example aspects of the present disclosure. The system 100 includes an array of sensors, including a consumption sensor 110 and a dispenser sensor 120. The consumption sensor 110 can be disposed on a disposable product and can be configured to monitor consumption of the disposable product. For instance, the consumption sensor 110 can provide signals indicative of the disposable product becoming soiled. The dispenser sensor 120 can be associated with a disposable product dispenser 112. The dispenser sensor 120 can provide signals indicative of an available quantity of disposable products in the dispenser 112.

The signals from the consumption sensor 110 and the dispenser sensor 120 can be communicated to a computing device 150, such as a smartphone, tablet, mobile device, laptop, desktop, wearable computing device, general purpose computing device, special purpose computing device, or other suitable computing device. The computing device 150 can implement an application to allow a user 152 to manage and control inventory of disposable products. The computing device 150 can receive the signals from the consumption sensor 110, the dispenser sensor 120 in addition to user information input by the user 152 via a suitable user interface and communicate data and information over a network 140 (e.g. the Internet) via a network access point 142. For instance, the computing device 150 and/or the sensors 110 and 120 can communicate information over a wireless network (e.g. a WiFi network) to the access point 142, which can then communicate information over the network 140 using any number of wired and/or wireless interfaces.

In particular implementations, the information is communicated to an information hub 160. The information hub 160 can be implemented on a server, such as a web server accessible via network 140. The information hub 160 can collect and store information associated with disposable product consumption for the user 152. The information hub 160 can also have general information about habits and practices of similar consumers. Personal identification information associated with such information can be removed and/or not stored to protect privacy concerns. This information can be processed and analyzed to assist the user in managing inventory of the disposable products.

For instance, the information hub 160 can implement an assessment module configured to estimate disposable product consumption and determine inventory status for one or more particular locations associated with the user 152. The information hub 160 can communicate notifications to the user 152 via a user interface implemented on the computing device 150 over the network 140. The notifications can include recommendations to replenish inventory at a particular location and with a specific recommended product choice.

The user can respond to the notification to trigger a replenishment action. During the replenishment action, the information hub 160 can communicate with a replenishment hub 170. The replenishment hub 170 can be used to coordinate the purchase and delivery of disposable product. For instance, the replenishment hub 170 can receive orders for a quantity of disposable products from the information hub 160 and/or the computing device 150. The replenishment hub 170 can coordinate delivery of the product to the user 152 in response to the orders.

Figure 2:
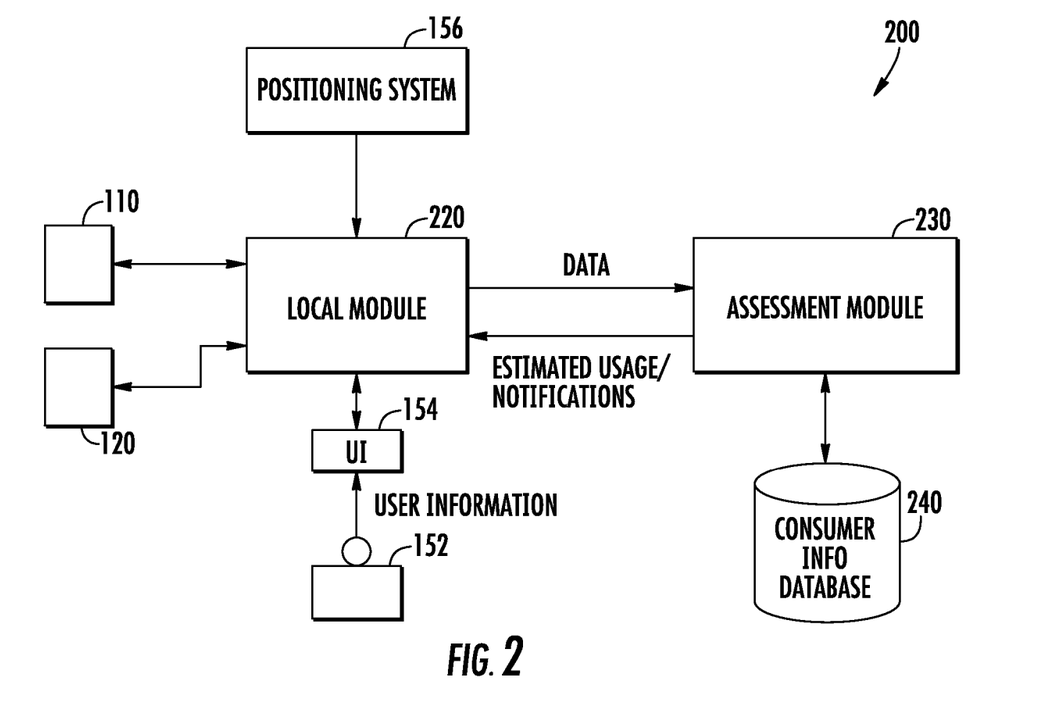
FIG. 2 depicts a block diagram of example system components according to example embodiments of the present disclosure.

With reference now to FIG. 2, details of example system components of one example implementation of the system 100 will now be set forth. As shown in FIG. 2, a local module 220 implemented on, for instance, computing device 150 (shown in FIG. 1) can process signals from various sources to determine data associated with consumption and available quantity of disposable products at a particular location.

More particularly, the local module 220 can receive signals indicative of product consumption from a consumption sensor 110. The consumption sensor 110 can be affixed to the disposable product and can communicate signals to the local module 220 indicative of the disposable product becoming soiled or otherwise consumed. The consumption sensor 110 can be any suitable sensor configured to communicate a signal indicative of use or consumption of a disposable product.

Figure 3:
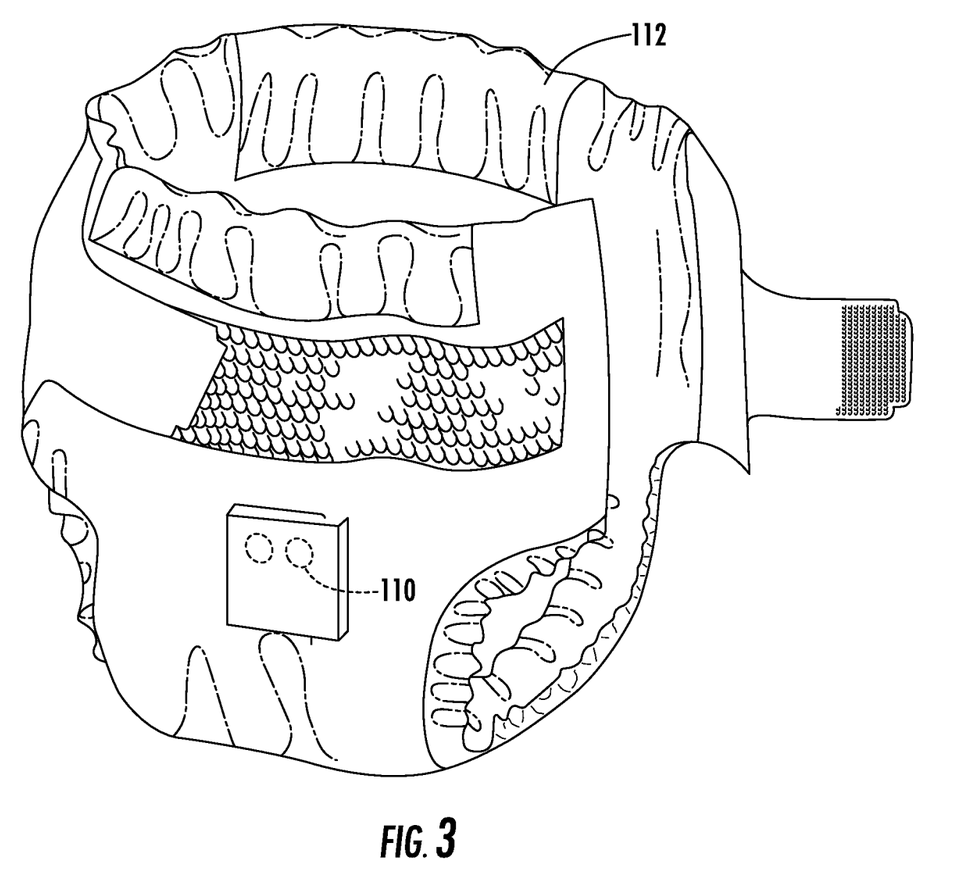
FIG. 3 depicts an example consumption sensor according to example embodiments of the present disclosure.

For example, FIG. 3 depicts one example consumption sensor 110 that can be used in accordance with example aspects of the present disclosure. As shown, the consumption sensor 110 is disposed on an absorbent article 112. The consumption sensor can communicate a signal indicative of the absorbent article 112 becoming soiled to the local module 220 (FIG. 2) via, for instance, a network or other communication medium.

In one example embodiment, the consumption sensor 110 can include conductive elements that monitor the presence of a fluid in the disposable product. A sensor can be disposed on the disposable product and can be configured to monitor changes in the various properties of the conductive elements. The sensor can provide signals indicative of consumption based on the changes of the various properties of the conductive elements. Certain sensors can provide a first type of signal for a first type of soiling event (e.g. a urine insult) and a second type of signal for a second type of soiling event (e.g. a BM insult). Example consumption sensors are disclosed in U.S. Pat. No. 8,274,393, U.S. Patent Application Publication No. 2010/016872, and U.S. Pat. No. 8,698,641, which are incorporated by reference herein. Other suitable consumption sensors can include a temperature sensor, a conductivity sensor, an optical sensor, a vibration sensor, a humidity sensor, a material expansion sensor, a chemical sensor, or other suitable sensor.

Referring to FIG. 2, the dispenser sensor 120 can be configured to provide signals indicative of an available quantity of disposable products in a disposable product dispenser to the local module 220. For instance, a dispenser of disposable products can maintain a specified quantity of disposable products. As a user removes disposable products from the dispenser, a sensor can provide signals indicative of the remaining quantity in the dispenser. For instance, the sensor can provide a signal every time a disposable product is removed. This can be tracked against a starting quantity of disposable products to determine a remaining quantity of disposable products in the dispenser.

The dispenser sensor 120 can be any suitable sensor configured to monitor an available quantity of disposable products at a disposable product dispenser. For instance, the dispenser sensor 120 can include one or more of a mechanical sensor, a laser sensor, an optical sensor, an RFID sensor, or other sensor configured to determine an available quantity of disposable products in a disposable product dispenser.

The local module 220 can further receive signals, for instance, from a positioning system 156. The positioning system 156 can be configured to provide signals indicative of location to the local module 220. In one particular implementation, the positioning system 156 is a positioning system associated with the computing device implementing the local module 220 and can provide location signals indicative of the location of the computing device. For instance, the positioning system can be a GPS positioning system or other positioning system implemented as a part of a smartphone running the local module 220. The positioning system 156 can use any suitable technique for providing location signals, such as GPS, proximity to cellular towers or WiFi hotspots, dead reckoning, or other suitable technique.

The positioning system 156 can also be associated with one or more of the consumption sensor 110 or dispenser sensor 120. For instance, the positioning system 156 can be implemented as part of the consumption sensor 110 and can provide signals indicative of the location of the consumption sensor 110. In addition and/or in the alternative, the positioning system 156 can be implemented as part of the dispenser sensor 120 and can provide signals indicative of the location of the dispenser sensor 120.

The local module 220 can be further configured to receive user information input by a user 152 via a suitable user interface 154. The user interface 154 can be implemented as a graphical user interface provided for display on a computing device implementing the local module 220, such as a user's smartphone implementing the local module 220. The user information can include one or more characteristics of the user or of a consumer of the disposable product that can be useful in inventory management of the disposable product.

For instance, the user information can include an identity and particular characteristics (e.g. age, weight, etc.) of a consumer (e.g. an infant) that actually uses the disposable product. This information can be useful in predicting disposable product usage trends for the particular consumer. For instance, the age of the consumer can be useful in recommending a type of disposable product for use by the consumer (e.g. a particular diaper size or whether to switch to training pants. The user information can further include an identity of a caretaker (e.g. a parent, childcare provider, grandparent) of a particular consumer of the disposable product. This information can be useful in predicting disposable product usage trends for a particular caretaker.

As another example, the user information can include location information manually entered by the user 152. This can be used to verify or supplement location signals provided by the positioning system 156. As yet another example, the user information can include calendar and/or planned location information associated with a consumer/caretaker. For instance, the calendar information can include particular times when an infant consumer is at daycare or at a grandparent's home versus being at a parent's home. This information can be useful in predicting estimated disposable product usage for the consumer at the various locations the consumer intends to visit. The user information can include other information entered by the user that can be useful in managing disposable product inventory.

The local module 220 can receive signals from the consumption sensor 110, the dispenser sensor 120, the positioning system 156, and from the user 152 via user interface 154 and can process the information to generate data for communication to an assessment module 230. The assessment module 230 can be implemented on the computing device 150 (FIG. 1) or on a remote computing device, such as a server associated with information hub 160 (FIG. 1).

The assessment module 230 can store and access information in consumer information database 240 and process the information to estimate disposable product usage and inventory status. The disposable product usage and inventory status can be provided to the local module 220 for communication to a user 152 via a suitable user interface 154. The user 152 or local module 210 (via automatic settings input by the user 152) can then communicate with the assessment module 230 or directly with a disposable product provider to coordinate purchase and delivery of disposable products to one or more specified locations.

The present disclosure discusses an example implementation using a local module 220 that is separate from an assessment module 230 for purposes of illustration and discussion. Those of ordinary skill in the art, using the disclosures provided herein, will understand that the example functionality of the local module 220 and assessment module 230 can be implemented as a single module or many modules without deviating from the scope of the present disclosure.

Figure 4:
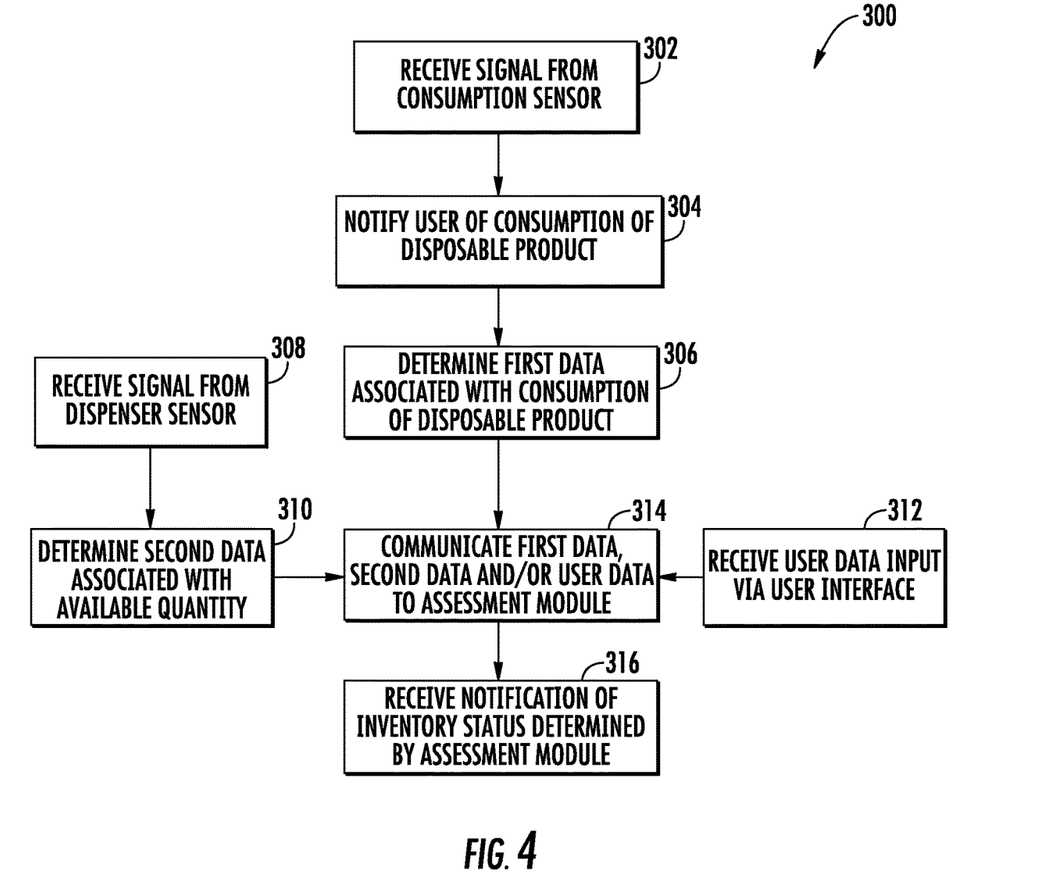
FIG. 4 depicts a flow diagram of an example method according to example embodiments of the present disclosure.

FIG. 4 depicts a flow diagram of an example method (300) according to example aspects of the present disclosure. The method (300) can be implemented by one or more computing devices. For instance, the method (300) can be an example set of operations implemented by local module 220 of FIG. 2. In addition, FIG. 3 depicts steps performed in a particular order for purposes of illustration and discussion. Those of ordinary skill in the art, using the disclosures provided herein, will understand that the various steps of any of the methods disclosed herein can be modified, adapted, omitted, rearranged, and/or expanded in various ways without deviating from the scope of the present disclosure.

At (302), a signal can be received from a consumption sensor. For instance, local module 220 of FIG. 2 can receive a signal indicative of consumption of a disposable product from a consumption sensor 110 associated with the disposable product.

At (304) of FIG. 4, a user can be notified of consumption of the disposable product based at least in part on the signal from the consumption sensor. For instance, the local module 220 of FIG. 2 can provide a notification or an alert to a user that a disposable product has been consumed. As one example, the user can be notified that an absorbent article, such as a diaper, has been soiled and needs to be changed. The notification can include an audible alert, vibratory alert, visual alert, or other suitable alert.

At (306), the method can include determining first data associated with the consumption of the disposable product. For instance, the local module 220 of FIG. 2 can determine first data based at least in part on signals received from the consumption sensor 110, positioning system 156, and/or user information input by user 152 via user interface 154. The first data can include any information associated with consumption of a disposable product, such as the time the disposable product was consumed, the type of disposable product, the consumer who was using the disposable product, etc. In particular embodiments, the first data can include location information correlated with data indicative of consumption of the disposable product provided, for instance, by a positioning system.

At (308) of FIG. 4, the method can include receiving a signal from a dispenser sensor. For instance, local module 220 of FIG. 2 can receive a signal indicative of an available quantity of a disposable product from a dispenser sensor 120 associated with a dispenser of the disposable products.

At (310) of FIG. 4, second data associated with an available quantity of the disposable product can be determined. For instance, the local module 220 of FIG. 2 can determine second data based at least in part on signal received from the dispenser sensor 120, positioning system 156, and/or user information input by user 152 via user interface 154. The second data can include any information associated with an available quantity of a disposable product, such as the time a disposable product was dispensed, a total number of disposable products available in the dispenser, data indicative of a remaining number of disposable products in the dispenser, the location of the dispenser as determined, for instance, by a positioning system 156, and other information.

At (312) of FIG. 4, the method can include receiving user data input via a user interface. For instance, local module 220 of FIG. 2 can receive user data input by user 152 via user interface 154. The user data can include information associated with a user, caregiver, or consumer of disposable products, such as an identification of a consumer of the disposable product, an age or weight of a consumer of the disposable product, an identification of a caretaker of a consumer of the disposable product, location information associated with a consumer of the disposable product, preferred disposable product information associated with a consumer of the disposable product, and calendar information associated with a consumer of the disposable product.

The first data, second data, and/or user data can be communicated to an assessment module at (314) of FIG. 4. For instance, the local module 220 of FIG. 2 can communicate one or more of the first data, the second data, and/or the user data to an assessment module implemented on a remote computing device over a network, such as the Internet. As will be discussed in more detail below, the assessment module can process the received data to estimate disposable product usage and inventory status.

At (316) of FIG. 4, a notification of an inventory status determined by the assessment module can be received. For instance, the local module 220 of FIG. 2 can receive the notification of inventory status communicated from the assessment module 230. The inventory status can include a recommendation to replenish disposable product inventory at a particular location. The notification can include a recommended quantity of disposable products and/or a recommended type of disposable products for replenishment.

Figure 5:
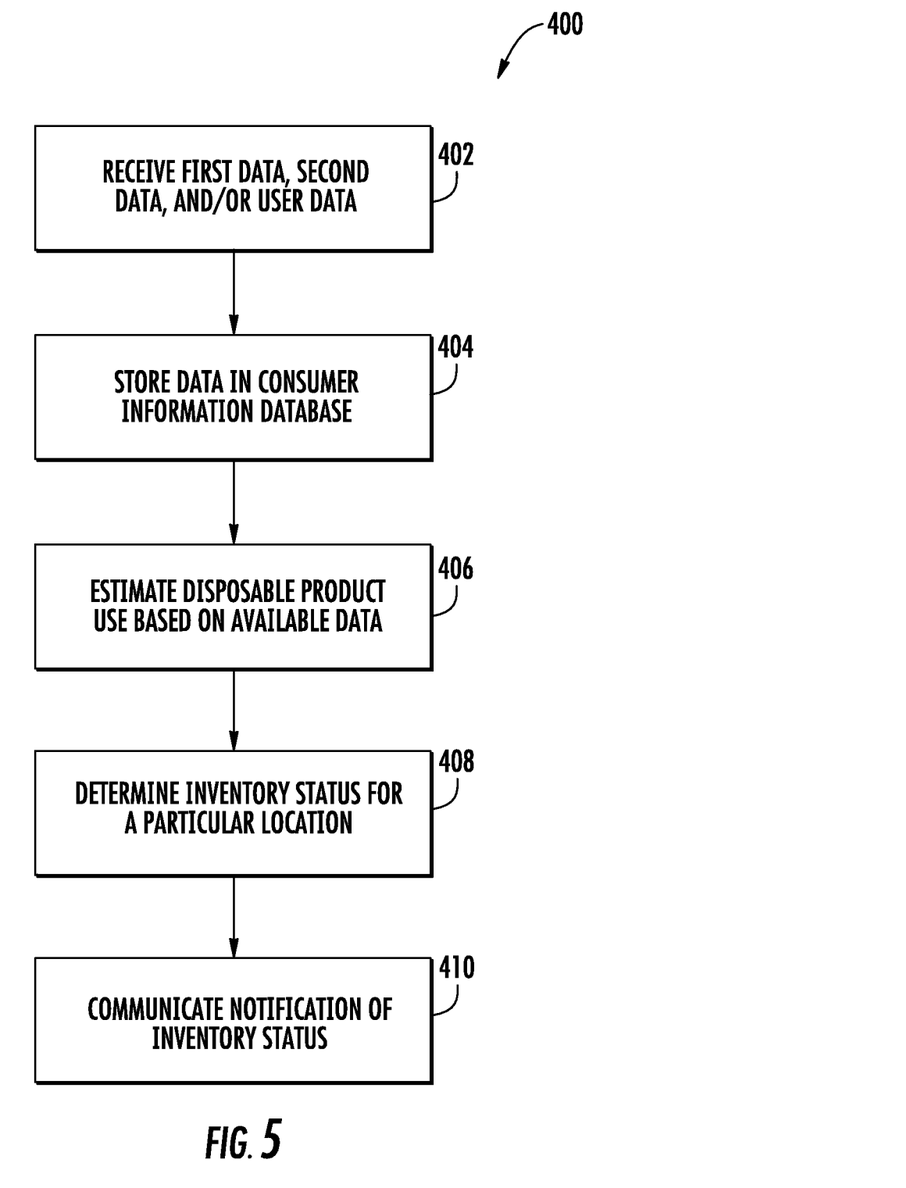
FIG. 5 depicts a flow diagram of an example method according to example embodiments of the present disclosure.

FIG. 5 depicts a flow diagram of an example method (400) according to example aspects of the present disclosure. The method (400) can be implemented by one or more computing devices. For instance, the method (400) can be an example set of operations implemented by assessment module 230 of FIG. 2.

At (402) of FIG. 5, the method includes receiving first data, second data, and/or user data. For instance, the assessment module 230 of FIG. 2 can receive one or more of the first data, the second data, and the user data communicated from the local module 220. At (404) of FIG. 5, the data received by the assessment module can be stored, for instance, in a consumer information database. The consumer information database can store information associated with a user that can be useful in predicting disposable product trends. In one particular embodiment, the consumer information database can store all information associated with a particular user and/or consumer of disposable products received by the assessment module.

At (406), the method can include estimating disposable product usage for a particular location based on the available data. For instance, the assessment module 220 of FIG. 2 can estimate disposable product usage for a particular location. The available data can include data stored in the consumer information database as well as first data, second data, and/or user data received by the assessment module.

According to particular aspects of the present disclosure, disposable product usage is estimated for a plurality of different locations based at least in part on the available data. For each location, the estimated disposable product usage can be a rate of consumption of the disposable products at a particular location. For instance, the available data can be processed using a suitable algorithm to identify trends of disposable product usage at a particular location over time. The algorithm can receive as inputs, for instance, frequency of disposable product usage at a particular location, available quantity of disposable product usage at a particular location, and other information to estimate disposable product usage for the particular location. Because the first data and second data can be associated with location information, the algorithm can determine estimated disposable product usage taking into account the location information.

In one implementation, a model describing usage of a disposable product at a particular location can be developed and/or refined based on data stored in the consumer information database. The model can be developed and/or refined, for instance, by adjusting weighting assigned to parameters in the model as data is received by the assessment module over time. Using the model or other suitable algorithm, the assessment module can estimate disposable product usage for a particular location.

Once the estimated disposable product usage has been determined, an inventory status for a particular location can be determined at (408) of FIG. 5. For instance, the assessment module 230 can determine an inventory status based at least in part on the estimated disposable product usage. In example implementations, the estimated disposable product usage determined for a particular location can be compared with data indicative of an available quantity of disposable products for a the particular location to determine if the inventory of disposable products at the particular location needs to be replenished.

In particular implementations, the assessment module can determine a particular quantity for replenishing inventory at a particular location. The quantity can be determined based at least in part on the estimated disposable product usage and data indicative of the available quantity of disposable products at the location. The assessment module can also determine a particular type of disposable product for replenishing inventory at the particular location. The type can be determined based on user data and other information in the consumer information database, such as age, weight, and other characteristics of the consumer of the disposable products, estimated trends, and data indicative of disposable product preferences.

At (410) of FIG. 5, the method can include communicating a notification of inventory status. For instance, the assessment module 230 of FIG. 2 can communicate a notification of inventory status to local module 220 where it can be presented in a suitable user interface 154 to a user 152. The user can then take appropriate action to trigger an inventory replenishment action at the particular location.

Figure 6:
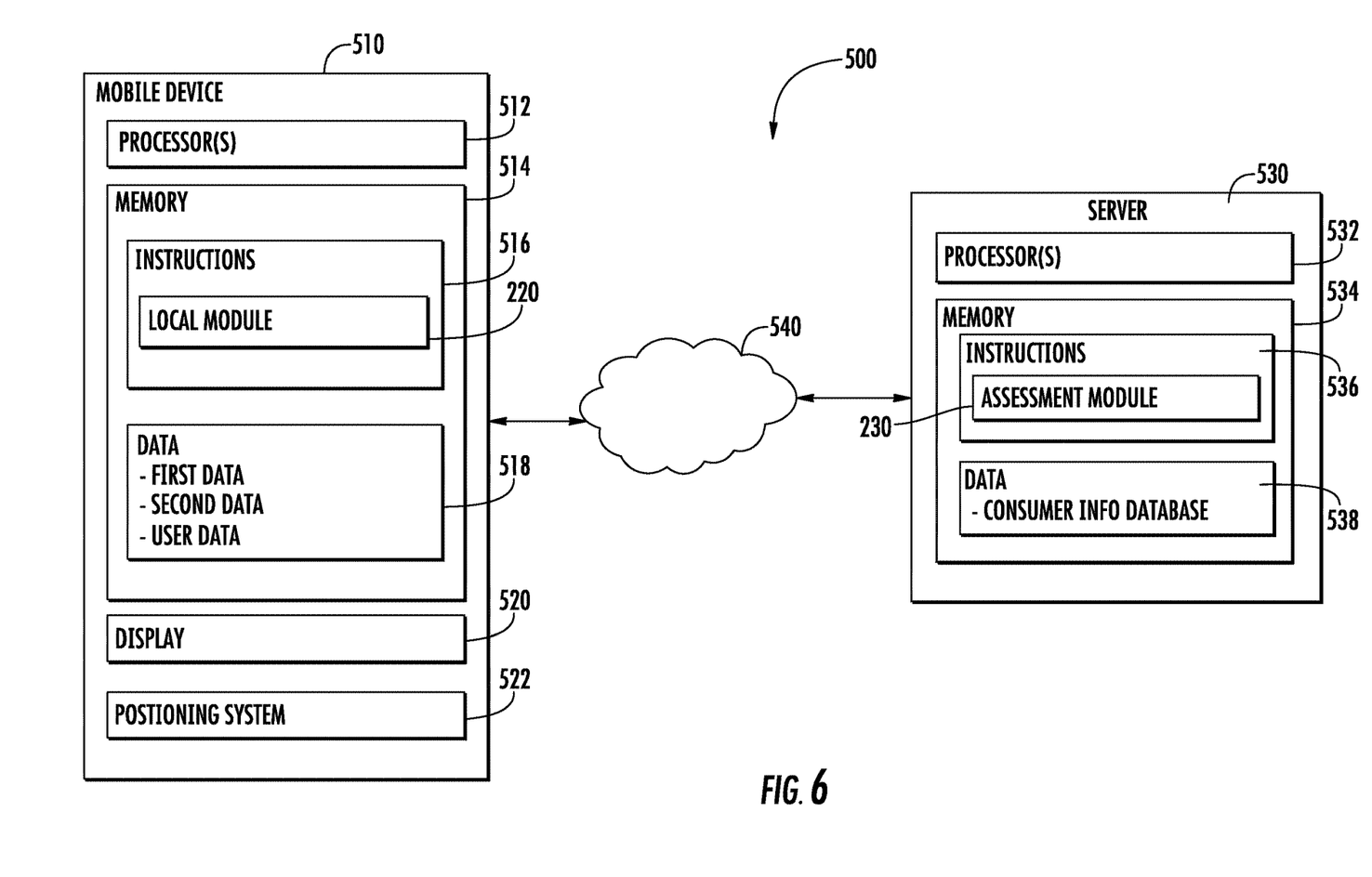
FIG. 6 depicts an example computing environment according to example embodiments of the present disclosure.

FIG. 6 depicts an example computing environment 500 for implementing example aspects of the present disclosure. The example computing environment 500 includes a client-server architecture for purposes of illustration and discussion. Those of ordinary skill in the art, using the disclosures provided herein, will understand that aspects of the present disclosure can be implemented using other suitable architectures, such as a single computing device.

The system 500 includes a mobile device 510, such as a smart phone, tablet, laptop, wearable computing device, or other device. As used herein, a mobile device is a device that is capable of being carried by a user (e.g. in a user's hand) while in operation. The device 510 can include one or more processor(s) 512 and one or more memory devices 514.

The one or more processor(s) 512 can include any suitable processing device, such as a microprocessor, microcontroller, integrated circuit, logic device, one or more central processing units (CPUs), and/or other processing devices. The one or more memory devices 514 can include one or more computer-readable media, including, but not limited to, non-transitory computer-readable media, RAM, ROM, hard drives, flash drives, or other memory devices.

The one or more memory devices 514 store information accessible by the one or more processors 512, including instructions 516 that can be executed by the one or more processors 512. For instance, the memory devices 514 can store instructions 516 for implementing a local module 220. The one or more memory devices 5 can also include data 518 that can be retrieved, manipulated, created, or stored by the one or more processors 512. The data 518 can include, for instance, for instance, first data, second data, and user data determined and/or received by the local module 220.

The device 510 can include various input/output devices for providing and receiving information from a user, such as a touch screen, touch pad, data entry keys, speakers, and/or a microphone. For instance, the computing device 510 can have a display 520 for providing a graphical user interface to a user.

The device 510 can also include a positioning system 522. The positioning system 522 can be a GPS system or other suitable system configured to provide signals indicative of the location of the device 510. Any suitable technique can be used to provide the location signals, such as satellite based positioning, proximity to cellular towers and/or WiFi hotspots, dead reckoning, and other suitable techniques.

The device 510 can also include a network interface used to communicate with one or more remote computing devices (e.g. server 530) over the network 540. A network interface can include any suitable components for interfacing with one more networks, including for example, transmitters, receivers, ports, controllers, antennas, or other suitable components.

The system 500 includes a server 530, such as a web server. The server 530 can be implemented using any suitable computing device(s). The server 530 can have one or more processors 532 and memory 534. The memory 534 can store instructions 536 (e.g. assessment module 230) and data 538 (e.g. consumer information database). The server 530 can also include a network interface used to communicate with computing device 510 over the network 540.

The network 540 can be any type of communications network, such as a local area network (e.g. intranet), wide area network (e.g. Internet), cellular network, or some combination thereof. The network 540 can include any combination of wired and/or wireless links. The network 540 can also include a direct connection between a computing device 510 and the server 530.

Figure 7:
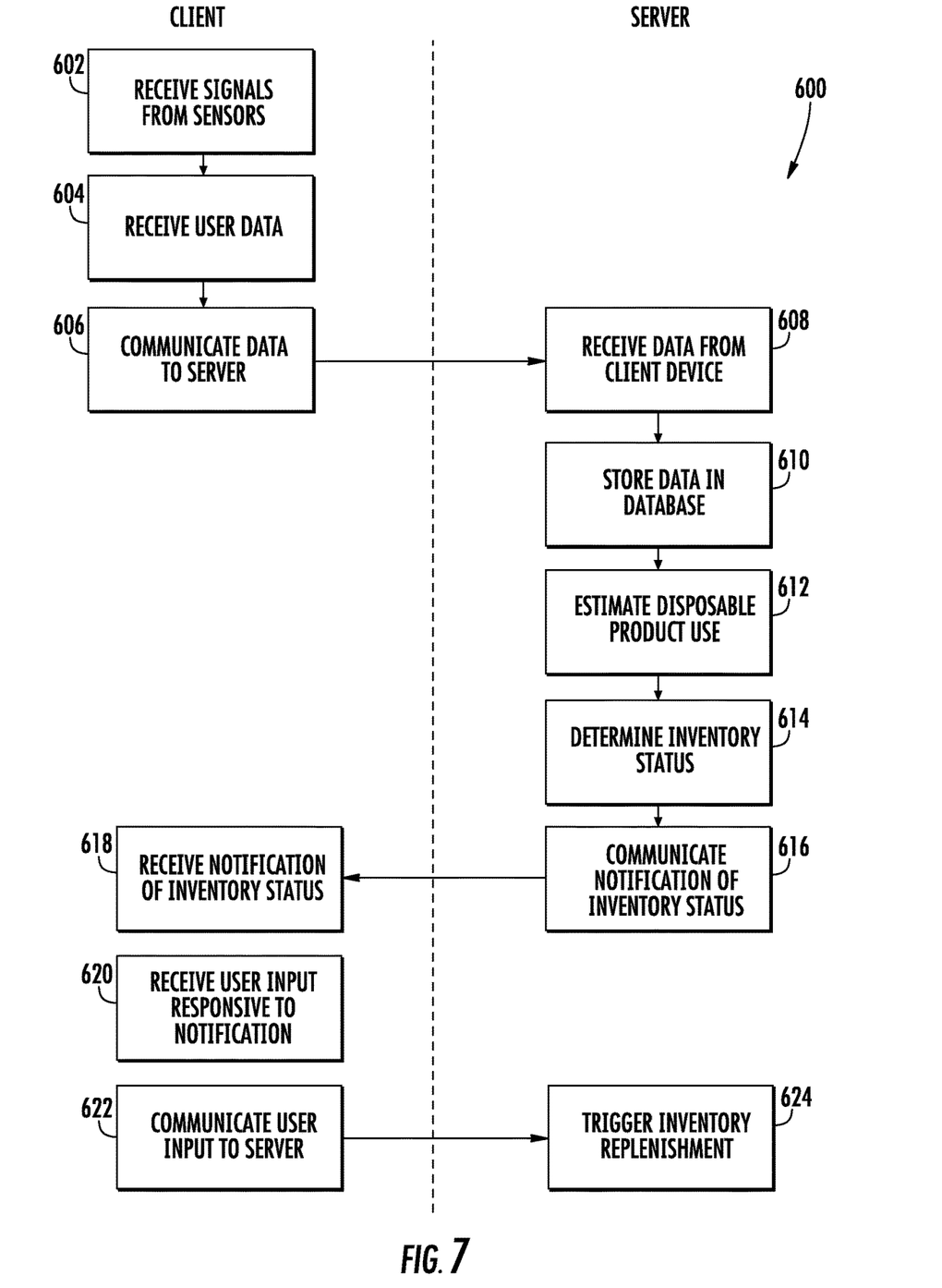
FIG. 7 depicts an example client-server flow diagram according to example embodiments of the present disclosure.

FIG. 7 depicts an example client-server flow diagram of an example method (600) that can be implemented by the computing environment 500 according to example aspects of the present disclosure. At (602), the client device can receive signals from one or more sensors such as a consumption sensor and a dispenser sensor. At (604), user data can be received at the client device. The user data can be manually input or otherwise input into the client device using a user interface. At (606), the data, including data associated with the signals from the sensors and/or the user data, is communicated to the server.

At (608), the server receives the data from the client device. The server can then store the data in a database (610), such as a consumer information database. The server can then estimate disposable product use for a particular location (612) and can determine inventory status for the particular location (614). The server can then communicate notification of the inventory status to the client (616).

At (618) the client receives the notification of inventory status. A user input responsive to the notification can then be received 620. The user input can include data sufficient to trigger inventory replenishment. The user input can be manually provided by a user or automatically provided based at least in part on settings and preferences associated with the user. For instance, a user can set up automatic triggering of inventory replenishment in response to notifications of inventory status at various locations. At (622), the user input is communicated to the server.

At (624), the server can trigger inventory replenishment. For instance, the server can arrange for the purchase and delivery of disposable products for the inventory replenishment through, for instance, a disposable product provider.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method for processing signals from one or more sensors associated with disposable products, comprising:
receiving, by one or more computing devices, a first signal indicative of consumption of a disposable product from a consumption sensor associated with the disposable product, wherein the consumption sensor is disposed on the disposable product and the first signal is indicative of the disposable product becoming soiled;
receiving, by the one or more computing devices, a second signal indicative of an available quantity of the disposable product inventory remaining in the dispenser from a second sensor disposed on or within a disposable product dispenser;

notifying, by the one or more computing devices, a user based at least in part on the first signal from the consumption sensor;

determining, by the one or more computing devices, first data associated with consumption of the disposable product based at least in part on the first signal, the first data comprising location information associated with the consumption of the disposable product;

determining, by the one or more computing devices, second data associated with the available quantity of the disposable product based at least in part on the second signal, the second data comprising location information associated with the available quantity of the disposable product;

receiving, by the one or more computing devices, data indicative of user information via a user interface provided for display by the one or more computing devices;

communicating, by the one or more computing devices, the first data, the second data, and the user information to an assessment module, the assessment module implemented by one or more processors, the assessment module configured to estimate a disposable product usage rate for a particular location based at least in part on the first data, the second data, and the user information; and receiving, by the one or more computing devices, a notification of an inventory status for the particular location, the inventory status being determined based at least in part on a comparison of the disposable product usage rate estimated by the assessment module with at least one of the first signal and the second signal.

2. The method of claim 1, wherein the user information includes one or more of an identification of a consumer of the disposable product, an age or weight of a consumer of the disposable product, an identification of a caretaker of a consumer of the disposable product, location information associated with a consumer of the disposable product, preferred disposable product information associated with a consumer of the disposable product, and calendar information associated with a consumer of the disposable product.

3. The method of claim 1, wherein the assessment module is implemented by one or more processors located on a remote computing device.

4. The method of claim 1, wherein the notification of the inventory status comprises a notification to replenish disposable product inventory at the particular location.

5. The method of claim 4, wherein the notification comprises a recommended quantity of disposable products for the particular location and further comprises an automatic replenishment signal based at least in part on the comparison of the disposable product usage rate with at least one of the first signal and the second signal.

6. The method of claim 4, wherein the notification comprises a recommended type of disposable products.

7. The method of claim 1, wherein the method further comprises receiving, by the one or more computing devices, a user input responsive to the notification, the user input triggering an inventory replenishment action.

8. The method of claim 1, wherein the location information is determined based at least in part on a signal associated with a positioning system implemented by the one or more computing devices.

9. A system for disposable product quantification and management, the system comprising:
a first sensor configured to monitor consumption of a disposable product, said first sensor being affixed to the disposable product;
a second sensor configured to monitor an available quantity of the disposable product inventory remaining in the dispenser, the second sensor disposed on and/or in a disposable product dispenser;
a first module implemented by one or more processors on a computing device, the first module comprising computer-readable instructions that when executed by the one or more processors cause the one or more processors to perform operations, the operations comprising:
receiving a first signal indicative of consumption of the disposable product from the first sensor, wherein the first signal is indicative of the disposable product becoming soiled;
receiving a second signal indicative of an available quantity of the disposable product from the second sensor;
notifying a user of consumption of the disposable product based at least in part on the first signal;
determining first data associated with consumption of the disposable product based at least in part on the first signal, the first data comprising location information associated with the consumption of the disposable product;
determining second data associated with the available quantity of the disposable product based at least in part on the second signal, the second data comprising location information associated with the available quantity of the disposable product;
receiving, by the one or more computing devices, data indicative of user information via a user interface provided for display by the one or more computing devices;
communicating, by the one or more computing devices, the first data, the second data, and the user information to a second module, the second module implemented by one or more processors, the second module configured to estimate a disposable product usage rate for a particular location based at least in part on the first data, the second data, and the user information; and
receiving a notification of an inventory status for the particular location, the inventory status being determined based at least in part on a comparison of the disposable product usage rate estimated by the second module with at least one of the first signal and the second signal.

10. The system of claim 9, wherein the computing device is a mobile computing device capable of being carried by a user while implementing the first module.

11. The system of claim 10, wherein the location information is determined by a positioning system implemented by the mobile computing device.

12. The system of claim 10, wherein the second module is implemented by a remote computing device accessible by the computing device via a network interface.

13. One or more tangible non-transitory computer-readable media storing computer-readable instructions that when executed by one or more processors cause the one or more processors to perform operations, the operations comprising:
receiving a first signal indicative of consumption of an absorbent article from a consumption sensor disposed on the absorbent article, wherein the consumption sensor is capable of providing one or more signals indicative of the disposable product becoming soiled;

receiving a second signal indicative of an available quantity of absorbent articles inventory remaining in the dispenser from a second sensor disposed on or within an absorbent article dispenser;

notifying a user of consumption of the absorbent article based at least in part on the first signal from the consumption sensor;

determining first data associated with consumption of the absorbent article based at least in part on the first signal, the first data comprising location information associated with the consumption of the absorbent article;

determining second data associated with the available quantity of absorbent articles based at least in part on the second signal, the second data comprising location information associated with the available quantity of a disposable product;

receiving data indicative of user information via a user interface;

communicating the first data, the second data, and the user information to an assessment module, the assessment module implemented by one or more processors, the assessment module configured to estimate an absorbent article usage rate for a particular location based at least in part on the first data, the second data, and the user information; and receiving a notification of an inventory status for the particular location, the inventory status being determined based at least in part on a comparison of the absorbent article usage rate estimated by the assessment module with at least one of the first signal and the second signal.

14. The one or more tangible, non-transitory computer-readable media of claim 13, wherein the operations further comprise receiving a user input responsive to the notification of the inventory status, the user input triggering an inventory replenishment action.

* * * * *